United States Patent [19]
Gengler

[11] Patent Number: 5,632,343
[45] Date of Patent: May 27, 1997

[54] SOIL DEFLECTING AND LEVELING REEL

[75] Inventor: Allan S. Gengler, Beloit, Kans.

[73] Assignee: Sunflower Manufacturing Co., Inc., Beloit, Kans.

[21] Appl. No.: 561,799

[22] Filed: Nov. 22, 1995

[51] Int. Cl.$^6$ .................................................. A01B 21/00
[52] U.S. Cl. ........................ 172/552; 172/68; 172/146
[58] Field of Search .................... 172/68, 49, 59, 172/63, 111, 519, 532, 540, 552, 184, 185, 187, 553, 556, 146; 403/167, 186; 404/124

[56] References Cited

U.S. PATENT DOCUMENTS

| | | | |
|---|---|---|---|
| 2,896,730 | 7/1959 | Spurgin | 172/552 X |
| 4,361,191 | 11/1982 | Landoll et al. | 172/552 X |

Primary Examiner—Terry Lee Melius
Assistant Examiner—Robert Pezzuto
Attorney, Agent, or Firm—Litman, McMahon and Brown, L.L.C.

[57] ABSTRACT

A soil deflecting and leveling reel is formed by end plates having a plurality of blades extending helically therebetween. Intermediate plates are positioned in spaced relation to the end plates and reinforce the reel blades. The reel is rotatably mounted on a reel support frame which is pivotally connected to a tillage tool frame in close proximity behind a disc gang. The reel support frame is resiliently urged to engage the reel with the ground whereby ground contact rotates the reel as the tool frame is drawn across a field. The blades of the rotating reel engage soil ejected upwardly by the discs and deflect the soil back to the ground to minimize lateral shifting of the soil and consequent formation of ridges and furrows by the discs. Additionally, the blades of the rotating reel break up clods of the soil and churn the soil to improve mixing and incorporation of chemicals applied to the soil.

20 Claims, 2 Drawing Sheets

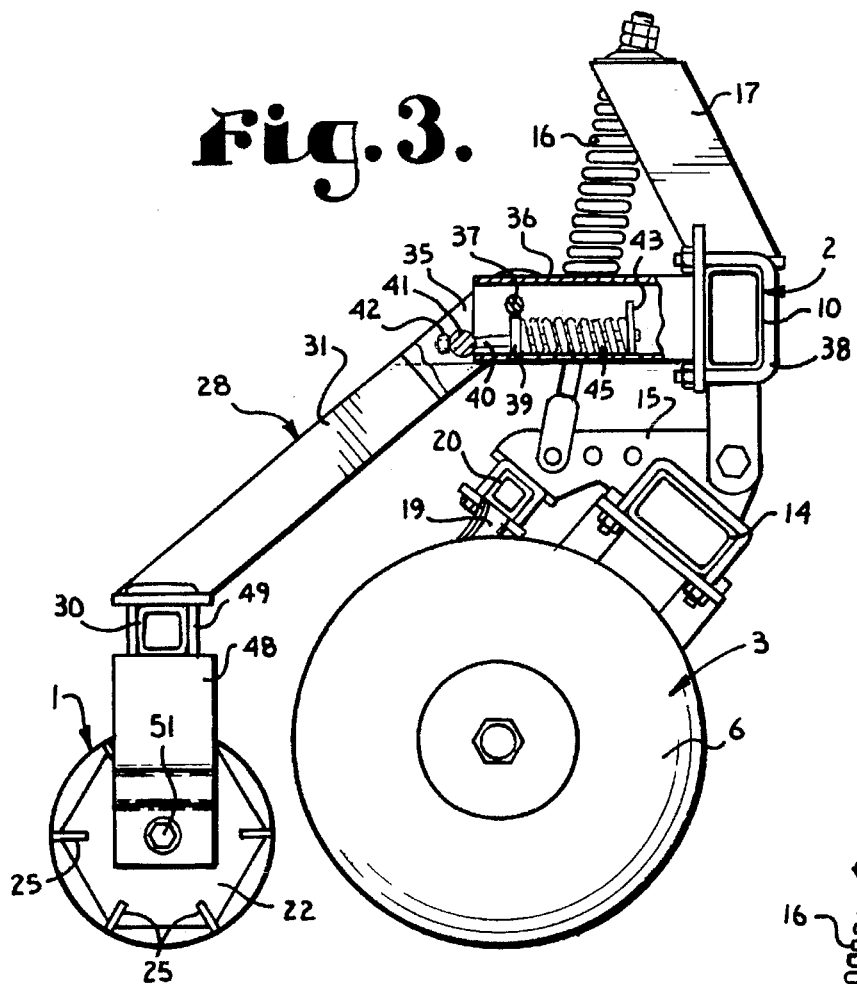
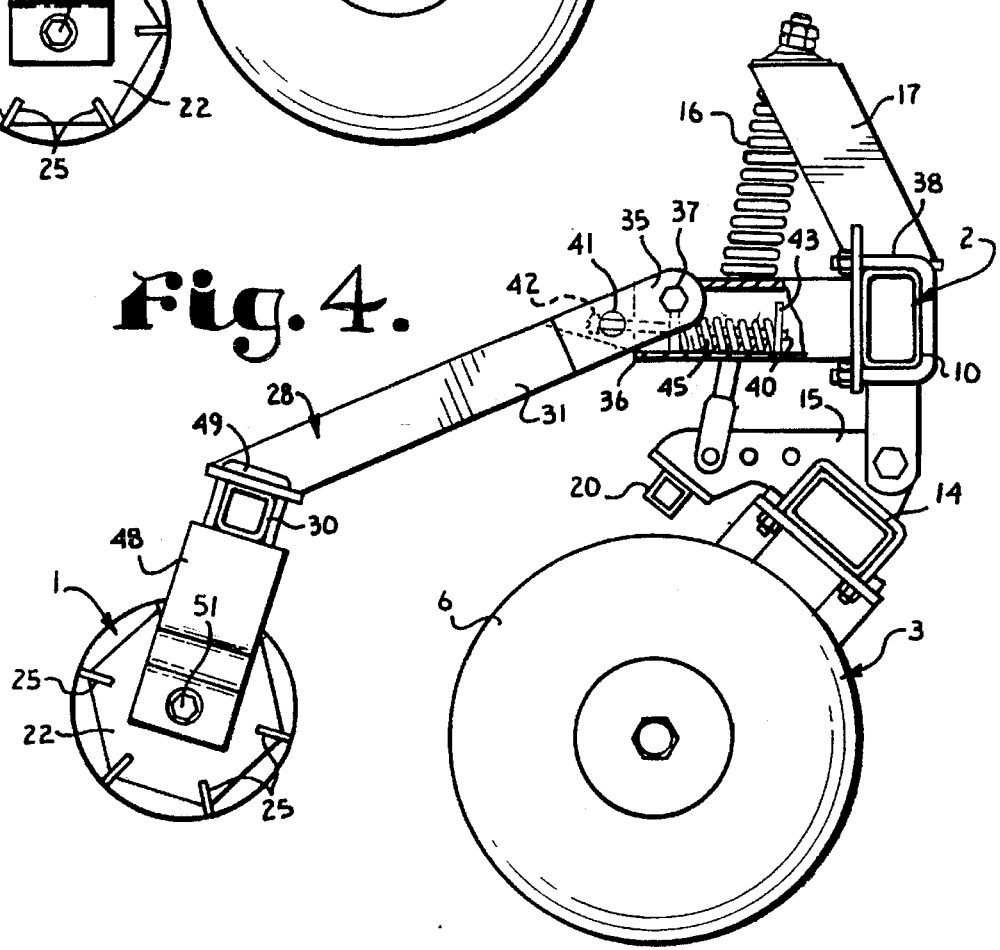

SOIL DEFLECTING AND LEVELING REEL

BACKGROUND OF THE INVENTION

Various types of tillage tool arrangements have been developed to prepare fields for planting. A type of such tools is referred to as one-pass tillage tools not because a seedbed can be completely prepared in a single pass over the field, but because several operations are performed in a one pass, reducing the number of passes across the field and thereby saving time and energy. The operations typically performed are discing, chemical application and incorporation for weed control, cultivating, and a harrowing operation. Discing cuts through and buries residue, such as, stalks, roots, and the like, from a previous crop. The discs help to level the soil to some degree by reducing ridges and filling in furrows. Discs also turn and mix the soil which is desirable when applying and incorporating chemicals in front of the discs. Discs offer these advantages over a straight coulter gang, which only cuts through residue. Typical discs are dished or concave, while coulters are flattened or planar.

A typical one-pass tool includes a single row of discs, which may be angled with an inner end of the gang positioned forward or rearward of the outer end, or a combination of alternately angled disc gangs. A problem that arises from a single row of discs is that the discs tend to move the soil laterally which can create ridges and furrows. The ridging and furrowing problem can be compounded when multiple passes are made in the same field. One solution is to add a second row of discs angled oppositely from the first to counteract the soil ridging and furrowing actions of the first disc gang. Such an arrangement is referred to as a tandem disc harrow. However, the addition of a second disc gang adds significant cost to the arrangement, requires lengthened frame members to accommodate the second disc gang and heavier lift axles for the increased weight, and increases the horsepower required to pull the tool frame. A second row of discs will also tend to bury more residue which may not be desired in some farming operations.

Other measures are taken to limit soil movement and minimize ridging. The discs used are relatively small, about eighteen to twenty inches in diameter and usually of low concavity. The disc angle is relatively low, commonly eight to ten degrees from lateral. Discing depth is limited by spring loaded gangs. Greater speeds of the discs through the soil increase the tendency toward ridging. However, slowing down from a conventional six to eight miles per hour to four miles per hour is not always feasible. These measures help to reduce ridging, but do not completely eliminate the problem.

Soil or spray shields used for chemical incorporation are sometimes mounted behind disc gangs to limit soil movement. Such shields can be mounted rigidly or allowed to swing. If shields are rigidly mounted close enough to the disc gangs to limit lateral soil movement, they tend to plug and can severely disrupt the flow of soil from the disc gangs. On the other hand, shields which are mounted for swinging are generally ineffective in preventing lateral soil movement behind disc gangs at normal working speeds.

Thus, there is a need for a tool or other means which prevents, counteracts, or otherwise compensates for the tendency of disc gangs to form ridges and furrows due to lateral movement of soil. Such a tool should work effectively behind single rows of discs and should work in a variety of soil conditions, moisture contents, and residues, and at a variety of working speeds.

SUMMARY OF THE INVENTION

The present invention provides a tool which effectively counteracts the tendency of single disc gangs to form ridges and furrows. An elongated reel having a plurality of helical blades is mounted transversely behind each disc gang and is rotated by ground contact. The blades are oriented radial to the axis of rotation of the reel. The reel is mounted close enough to the disc gang that soil particles and clods of soil, thrown up behind the discs by rotation of the discs as they are drawn through the soil, are deflected back to ground or churned by entry into the rotating reel and deposited randomly on the ground. These actions, along with the reel rolling over the soil broken by the discs, tends to level out the soil behind the disc gangs.

Each reel includes a pair of end plates having the blades extending helically therebetween. The helical shape of the blades give the reel an overall cylindrical shape which prevents vibrations which would occur in rolling if straight blades were used, which would give the reel a prismatic shape. One or more intermediate plates, similar to the end plates, may be positioned between the end plates to reinforce the blades. The end plates are rotatably mounted in bearings on brackets depending from a cross beam which is connected by an arm to a tillage tool frame. The arm is pivotally connected, as to a cross member of the tool frame, and has a spring engaged between the arm and the tool frame to urge the reel toward ground contact.

The reel has a diameter in a range of thirty to eighty percent (30% to 80%) of the diameter of the discs and, preferably, about one half the diameter of the discs. For discs with a diameter of twenty inches, the reel has a diameter of about ten inches. Reels smaller than thirty percent of the disc diameter are too small to catch all the soil thrown up by the discs such that some soil is thrown over the reel. Also, smaller reels have a greater tendency to clog up in wetter conditions. Reels larger than eighty percent of the disc diameter have a slow rotational speed and would require additional blades to be effective in deflecting the soil back to ground. At about half the diameter of the discs, the reel rotates rapidly and is large enough to engage most of the soil thrown up by the discs without plugging. The faster rotation of the reel promotes mixing of the soil which increases breakup of clods and chemical incorporation in the soil.

The reels are positioned as close behind the disc gangs as possible without interfering with the function of the discs. The preferred disc/reel separation range is from two to six inches. A separation of less than two inches is effective in preventing lateral soil movement but restricts the mixing action of the reel on the soil. The maximum disc/reel separation is in a range of one to one and one half (1.0 to 1.5) times the diameter of the reel. For a ten inch reel, the distance range is ten to fifteen inches. Noticeable lateral soil movement takes place in the range of ten to fifteen inches behind the disc gang, and soil from the discs tends to be thrown over the top of a reel beyond this range, particularly at high operating speeds.

The preferred reel has six blades spaced radially and circumferentially about the end plates. The reel bearings are at the outside ends of the reel, and the reel does not have a center shaft. The open center of the reel reduces plugging in wet conditions. Soil that is thrown into the center of the reel tends to be churned which tends to breakup and mix the soil and increases chemical incorporation. Flattened blades are preferred with the flat sides oriented circumferentially, providing more surface area to deflect the soil and providing greater open space about the reel for entry of soil into the center part of the reel.

OBJECTS AND ADVANTAGES OF THE INVENTION

The principal objects of the present invention are: to provide an improved tillage tool; to provide such a tool which overcomes a tendency of single disc gangs to form ridges and furrows in soil which has been worked by such discs; to provide a cylindrical reel formed by end plates and blades extending between the end plates which is rotatably mounted behind a disc gang; to provide such a reel which is rotated by ground contact whereby the blades engage, and deflect back to ground, soil thrown up by discs cutting through such soil; to provide such a reel which is open internally whereby soil which enters the reel is churned to thereby break up such soil and mixed to enhance incorporation of chemicals applied to such soil; to provide such a reel having helically extending blades to give the reel a cylindrical form to avoid vibrations from ground engagement and ensuing rotation; to provide such a reel which is positioned to maximize leveling effects without hindering discing action and to avoid plugging in wet soil and high crop residue conditions; to provide a deflecting and leveling reel of such diametric dimension as to rotate at an adequate rate to deflect and break up soil and to provide sufficient internal volume to avoid plugging; to provide such a reel which can be added to a number of existing tillage frames employing single disc gangs; to provide such a reel which does not require lengthening or strengthening of the tillage frame design or increases in drawing horsepower; and to provide such a soil deflecting and leveling reel which is economical to manufacture, which is effective and efficient in use, and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 3 is a fragmentary side elevational view of the reel shown in a fully retracted position behind a disc gang.

FIG. 4 is a view similar to FIG. 3 and shows the reel of the present invention in a fully extended position behind the disc gang.

DETAILED DESCRIPTION OF THE INVENTION

Figure 1:
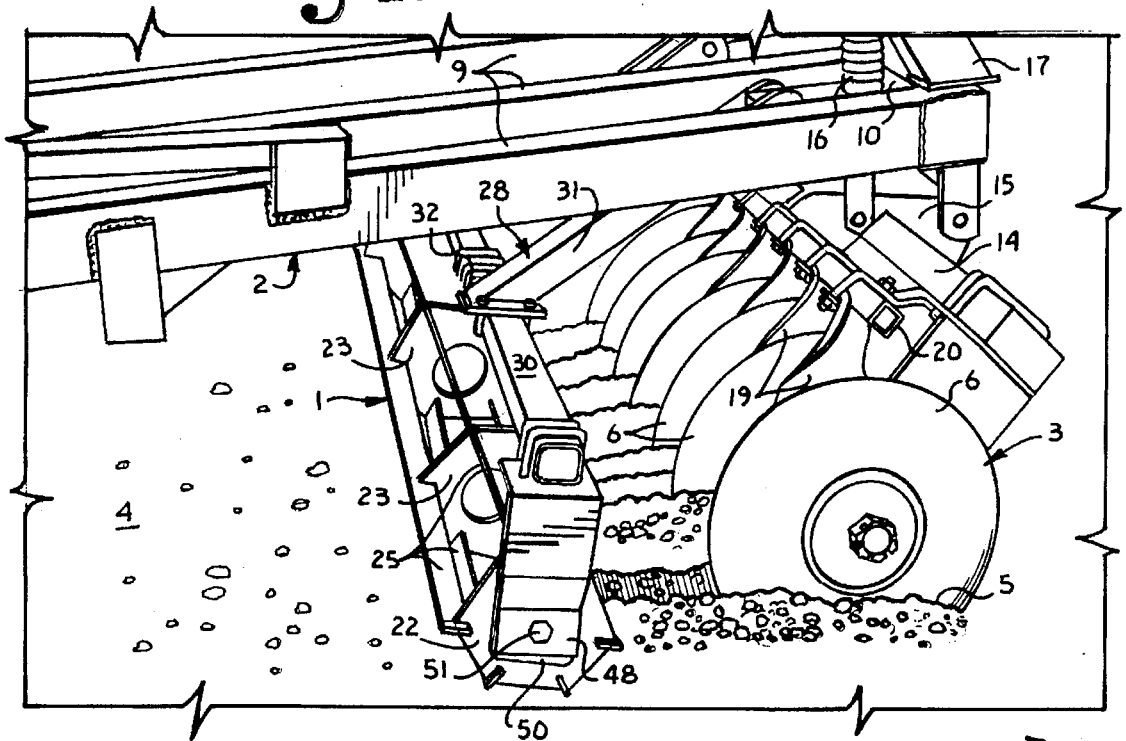
FIG. 1 is a fragmentary perspective view illustrating a soil deflecting and leveling reel which embodies the present invention mounted on a tillage frame.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the Drawings in More Detail

The reference numeral 1 generally designates a soil deflecting and leveling reel which embodies the present invention. In general, the reel 1 is mounted on a tillage tool frame 2 behind a disc gang 3 to deflect back to ground 4 soil 5 ejected upwardly as a result of the discs 6 being drawn through the ground 4. The overall effect of the reel 1 is to level the ground 4 behind the discs 6 which would otherwise tend to create furrows and ridges (not shown) in the ground 4 after being worked by the discs 6.

The tool frame 2 is preferably a conventional tillage tool frame of the type which is generally supported on ground engaging wheels (not shown) mounted on the frame 2, rather than the type of tool bar connected directly to and supported by a tractor vehicle (not shown), although mounting the reel 1 on such a directly connected tool bar is not precluded by the present invention. The frame 2 includes longitudinal frame members 9 interconnected with transverse frame members 10. The disc gangs 3 are also conventional and include a plurality of discs 6 rotatably mounted in spaced relation along a generally transversely extending disc shaft (not shown). The disc gang 3 includes a main disc frame member 14 pivotally connected by cranks 15 to a cross member 10 of the tool frame 2. Outer ends of the cranks 17 are connected by compression springs 16 to upstanding spring brackets 17 which are mounted on the cross member 10. The springs 16 resiliently urge the cranks 15 and, thus, the discs 6 toward engagement with the ground 4 when the tool frame 2 is lowered for soil working. The illustrated disc gangs 3 include disc scrapers 19 mounted on a scraper support bar 20 connected to the rear ends of the cranks 17 and extending parallel to the disc frame member 14. The scrapers 19 engage soil and residue on inner sides of the discs 6 to prevent them from becoming clogged in wet soil conditions.

The reel 1 includes spaced apart end plates 22 and intermediate plates 23 positioned between the end plates 22. The illustrated end plates 22 and intermediate plates 23 are hexagonal in shape, although other shapes may be used. A plurality of blades 25 extend between the end plates 22 and are reinforced by the intermediate plates 23. The blades 25 engage the plates 22 and 23 at vertexes of their hexagonal shapes. The blades 25 preferably extend helically between the end plates, giving the reel 1 an overall cylindrical form which allows the reel 1 to roll along the surface of the ground 4 with minimal vibration.

The reel 1 is rotatably supported on a reel support frame 28 which is pivotally mounted on the tool frame 2. The reel frame 28 includes a cross member 30 and one or more diagonal arms 31. The arms 31 have lower mounting plates 32 which receive U-bolts 33 to secure the reel cross member 30 thereto. Upper ends of the arms 31 have spaced apart ears 35 which are received on opposite sides of mounting stubs 36 which extend rearward from the tool frame transverse member 10. The ears 35 and the rear end of the stub 36 receive a pivot bolt 37 to pivotally connect the arm 31 to the stub 36. The stub 36 may be connected to the tillage frame member 10, as by U-bolts 38. Although the tool support frame 28 is described and illustrated as being connected directly to the tillage frame member 10, the frame 28 could alternatively be connected to other components of the tool frame 2 or indirectly connected to the tool frame 2 through other frame members connected to the tool frame 2, such as the main disc frame member 14.

Preferably, the reel 1 is resiliently urged toward ground engagement. The illustrated stub 36 has an internally mounted spring abutment 39 affixed therein. A spring rod 40 extends through the abutment 39 and through a bar 41 extending between and pivotally connected to the ears 35 at the upper end of the reel support arm 31. A retainer nut 42 is secured to the rear end of the rod 40, and a spring retainer plate 43 is secured to a front end of the rod 40. A compression spring 45 is positioned on the rod 40 and has opposite ends engaged with the abutment 39 and the spring retainer plate 43 respectively. The spring 45 resiliently urges the spring retainer plate 43 away from the abutment 39, transferring the force of the spring 45 through the rod 40 and bar 41 to the arm 31. The arm 31 is, thus, urged about the pivot bolt 37 toward engaging the reel 1 with the ground 4, whereby movement of the tool frame 2 over the ground 4 causes rotation of the reel 1.

Figure 2:
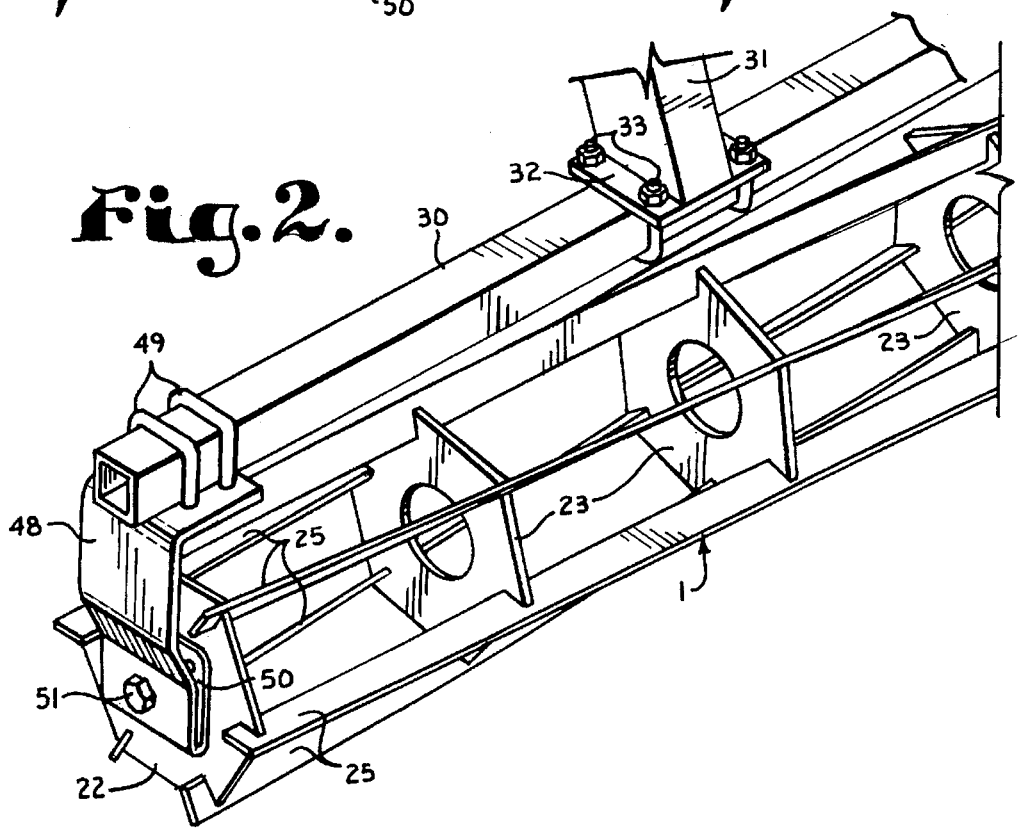
FIG. 2 is a fragmentary perspective view illustrating details of the soil deflecting and leveling reel.

The cross member 30 of the reel support frame 28 has reel support brackets 48 (FIG. 2) depending from opposite ends thereof. The illustrated brackets 48 are connected to the ends of the cross member 30, as by U-bolts 49. The end plates 22 of the reel 1 have bearing assemblies 50 mounted thereon. Axle bolts 51 extend through lower ends of the brackets 48 and engage the bearing assemblies 50, whereby the reel 1 is journaled on the reel support frame 28 and is freely rotatable thereon. Preferably, there is no axle extending between the end plates 22 of the reel 1 to provide maximum space within the blades 25 between adjacent sets of the intermediate plates 23 or an intermediate plate 23 and an end plate 22, thereby promoting better mixing of any soil 5 entering the reel 1 and avoiding clogging in wet field conditions.

The illustrated discs 6 are conventional in configuration and are spherically dished. Upon being drawn through the ground surface, the discs 6 cut through soil 5, breaking it up, and through roots and surface residue from previous crops. The discs 6 rotate, thereby churning and mixing the soil 5 and crop residue and improving the incorporation of chemicals, such as fertilizers, herbicides, and insecticides, which are applied forward of the disc gang 3. The rotation of the discs 6 tends to eject soil upward and laterally as the ground 4 is worked, which tends to create furrows and ridges behind the disc gang 3. The reel 1 is positioned behind the disc gang 3 at such a location as to engage and deflect soil 5 ejected upwardly by the discs 6 back to the ground 6.

A preferred separation distance between the discs 6 and the reel 1 is in a range of two to six inches. Although a separation distance of less than two inches is effective in preventing the formation of ridges and furrows, it also limits the desired mixing action of the reel 1. A maximum desired separation distance is in a range of 1.0 to 1.5 times the diameter of the reel 1.

The diameter of the reel 1 is desirably in a range of thirty to eighty percent of the diameter of the discs 6. The illustrated discs 6 have a typical diameter of twenty inches, and the illustrated reel 1 has a diameter of about 10.75 inches. Reels smaller than thirty percent of the disc diameter have a relatively high rotation speed from ground contact, but because of their size do not catch much of the soil ejected by the discs 6, such that leveling and mixing capability of such small reels is inadequate. Such small reels also tend to become clogged in wet field conditions. Reels larger than eighty percent of the disc diameter rotate slowly, whereby they are less effective in engaging and deflecting soil for a given number of reel blades 25. A preferred size for the reel 1 is about half the diameter of the discs 6, which combines the higher rotation speed of smaller diameter reels with the increased openness of the larger diameter reels.

The reel blades 25 are preferably flat rather than round, and the illustrated blades 25 have a cross section of 0.25 inch by 1.5 inches. The blades 25 are oriented on the reel 1 with the widest dimension or sides directed circumferentially. Such orientation provides a wide area to engage and deflect soil 5 thrown up by the discs 6 and a narrow profile to allow soil to easily enter and exit the reel 1. Round blades of a comparable cross sectional area reduce the soil impact area and decrease the openings between the blades for soil to enter the reel 1. Additionally, rounded blades have a tendency to pack the soil over which the reel 1 rolls and a greater tendency to clog in wet conditions. Preferably, the thickness of the blades 25 is less than half the width of the blades, and the width is within a range of five to twenty percent of the diameter of the reel 1. At the lower end of the range, the ability of the blades 25 to deflect soil is limited, while at the higher end of the range, clogging of the reel 1 becomes a problem.

Although the preferred embodiment of the present invention has been described and illustrated to include the reel 1 having the helically extending blades 25, other configurations of rotating devices to deflect soil 5 thrown up by the discs 6 are envisioned. Such devices (not shown) include tools referred to as rolling harrows, rolling baskets, rotary crumblers, and the like. Such devices typically include axially or helically oriented elements spaced radially from a rotary axis of the device. Another type of device includes flattened elements extending generally radially from an arbor. While the configuration of the reel 1, as described, is preferred for its particularly useful combination of features, such other rotary soil working tools could alternatively be employed in place of the reel 1, although to a somewhat lesser degree of efficiency. Thus, such other rotary devices are considered to be functional equivalents of the reel 1 in the present invention.

It is to be understood that while certain forms of the present invention have been illustrated and described herein, it is not to be limited to the specific forms or arrangement of parts described and shown.

What is claimed and desired to be secured by Letters Patent is as follows:

1. A tillage tool apparatus comprising:
   (a) a tillage tool frame having a forward direction of travel;
   (b) a tillage disc connected to said frame and having a disc axis extending generally transverse to said direction of travel;
   (c) a reel assembly including a soil deflecting reel member mounted to enable rotation of said reel member about an axis of rotation;
   (d) said reel assembly being connected to said frame to position said reel member immediately behind said disc; and
   (e) said reel member rotating during travel of said frame in said forward direction and being positioned at such a distance behind said disc that said reel member engages and deflects to ground soil particles and clods thrown up by engagement of said disc with said soil, thereby minimizing lateral shifting of said soil behind said disc.

2. An apparatus as set forth in claim 1 wherein reel assembly includes a reel support frame connected to said tool frame, and said reel member includes:
   (a) a pair of spaced apart end plates having peripheral edges;
   (b) a plurality of deflector blade members extending between said end plates and spaced circumferentially about the peripheral edges to form said reel member; and (c) said reel member being rotatably mounted on said reel support frame by journal connections of said end plates to said reel support frame.

3. An apparatus as set forth in claim 2 wherein:
(a) each blade member has a flattened cross section including opposite flat surfaces; and
(b) said flat surfaces are oriented generally circumferentially about said axis of rotation of said reel member.

4. An apparatus as set forth in claim 1 wherein:
(a) said reel member includes a plurality of circumferentially spaced deflector blades.

5. An apparatus as set forth in claim 1 and including:
(a) a bias spring engaged between said reel assembly and said tool frame and resiliently urging said reel member into ground contact.

6. An apparatus as set forth in claim 1 wherein:
(a) said disc has a disc diameter; and
(b) said reel member has a reel diameter in a range of thirty to eighty per cent of said disc diameter.

7. An apparatus as set forth in claim 6 wherein:
(a) said reel diameter is approximately one half said disc diameter.

8. An apparatus as set forth in claim 1 wherein:
(a) said disc has a circumferentially extending peripheral edge;
(b) said reel member occupies a substantially cylindrical volume having a cylindrical surface and a reel diameter; and
(c) said reel member is positioned such that a maximum separation between said cylindrical surface and the peripheral edge of said disc is in a range of one to one and one half said reel diameter.

9. An apparatus as set forth in claim 8 wherein:
(a) separation between said cylindrical surface and said peripheral edge of said disc is in a range of two to six inches.

10. A tillage tool apparatus comprising:
(a) a tillage tool frame having a forward direction of travel;
(b) an elongated disc gang assembly connected to said frame in generally transversely extending relation to said direction of travel, said disc gang including a plurality of soil engaging discs;
(c) a reel assembly including a reel support frame having an elongated soil deflecting reel member mounted thereon to enable rotation of said reel member about an axis of rotation;
(d) said reel member including a plurality of deflector blade members positioned about said reel member and extending therealong;
(e) said reel frame being connected to said frame to position said reel member immediately behind said disc gang; and
(f) said reel member rotating during travel of said frame in said forward direction and being positioned at such a distance behind said disc gang that said blade members of said reel member engage and deflect to ground soil particles and clods thrown up by engagement of said discs with said soil, thereby minimizing lateral shifting of said soil behind said disc gang.

11. An apparatus as set forth in claim 10 wherein said reel member includes:
(a) a pair of spaced apart end plates having peripheral edges;

(b) said plurality of deflector blade members extending between said end plates and being spaced circumferentially about the peripheral edges of said end plates; and
(c) said reel member being rotatably mounted on said reel support frame by journal connections of said end plates to said reel support frame.

12. An apparatus as set forth in claim 11 wherein:
(a) each blade member has a flattened cross section including opposite flat surfaces; and
(b) said flat surfaces are oriented generally circumferentially about said axis of rotation of said reel member.

13. An apparatus as set forth in claim 10 wherein:
(a) said reel member includes a plurality of helically extending deflector blades spaced circumferentially thereabout.

14. An apparatus as set forth in claim 10 wherein said reel support frame includes:
(a) an elongated cross member having opposite ends;
(b) a pair of end brackets depending respectively from said opposite ends of said cross member, said reel member being positioned between and rotatably connected to said end brackets;
(c) a reel support arm having a lower end connected to said cross member and an upper end pivotally connected to said tool frame; and
(d) a bias spring engaged between said reel support arm and said tool frame and resiliently urging said arm in such a direction as to position said reel member in said ground contact.

15. An apparatus as set forth in claim 10 wherein:
(a) said disc gang includes a plurality of disc members mounted thereon, said disc members having a disc diameter; and
(b) said reel member has a reel diameter in a range of thirty to eighty per cent of said disc diameter.

16. An apparatus as set forth in claim 15 wherein:
(a) said reel diameter is approximately one half said disc diameter.

17. An apparatus as set forth in claim 10 wherein:
(a) said disc gang includes a plurality of disc members mounted thereon, each of said disc members having a peripheral edge;
(b) said reel member occupies a substantially cylindrical volume having a cylindrical surface and a reel diameter; and
(c) said reel member is positioned such that a separation between said cylindrical surface and the peripheral edges of said disc members is in a range of two to six inches.

18. A tillage tool apparatus comprising:
(a) a tillage tool frame having a forward direction of travel;
(b) an elongated disc gang assembly connected to said frame in generally transversely extending relation to said direction of travel, said disc gang including a plurality of soil engaging discs;
(c) a reel assembly including a reel support frame having an elongated reel member mounted thereon to enable rotation about an axis of rotation of said reel member;

(d) said reel support frame including:
  (1) an elongated cross member having opposite ends;
  (2) a pair of end brackets depending respectively from said opposite ends of said cross member; and
  (3) a reel support arm having a lower end connects said cross member and an upper end pivotally connected to said tool frame;
(e) said reel member including
  (1) a pair of spaced apart end plates having peripheral edges;
  (2) a plurality of deflector blade members extending between said end plates and being spaced circumferentially about the peripheral edges of said end plates; and
  (3) said reel member being positioned between said end brackets of said reel support frame and having said end plates rotatably connected said end brackets;
(f) a bias spring engaged between said reel support arm and said tool frame and resiliently urging said arm toward ground contact of said reel member;
(g) said reel frame being connected to said frame to position said reel member immediately behind said disc gang; and
(h) said reel member rotating during travel of said frame in said forward direction and being positioned at such a distance behind said disc gang that said blade members of said reel member engage and deflect to ground soil particles and clods thrown up by engagement of said discs with said soil, thereby minimizing lateral shifting of said soil behind said disc gang.

19. An apparatus as set forth in claim 18 wherein:
(a) said disc members have a disc diameter; and
(b) said reel member has a reel diameter approximately one half said disc diameter.

20. An apparatus as set forth in claim 18 wherein:
(a) each of said disc members has a peripheral edge;
(b) said reel member occupies a substantially cylindrical volume having a cylindrical surface and a reel diameter; and
(c) said reel member is positioned such that a separation between said cylindrical surface and the peripheral edges of said disc members is in a range of two to six inches.

* * * * *